Patented Jan. 29, 1929.

1,700,404

UNITED STATES PATENT OFFICE.

ALFRED P. GOODELL, OF SALEM, AND GARDNER W. TARR, OF EVERETT, MASSACHUSETTS.

WATER PAINT.

No Drawing. Application filed March 11, 1926. Serial No. 94,040.

In the ordinary water paint, an adhesive, such as casein, glue, albumen or similar animal proteid, is substituted for the expensive linseed or similar oil vehicle of the usual oil paint. Such vehicle in itself, however, contains nothing to replace the characteristic qualities of the oil vehicle as regards pigment suspension and free brushing, flowing and spreading. It has therefore been customary to build up the paint body, and its opacity, but this usually causes the paint to become heavy and difficult to spread, and when applied thickly enough to cover the surface in a single coat, peels, laps, checks and cracks off in flakes and strips. Unless the paint body is built up, the paint is too thin, and will not only run when applied, but the paint film has a tendency to snap open into small pin holes or globules, which will not fill up unless the painter goes over the surface again, with resultant waste of labor and material. To offset this condition, it is usual to first apply a priming coat to the surface.

We have discovered that a water paint of greatly improved qualities as regards opacity, flow and brushing and covering powers may be produced by mixing with the usual adhesive vehicle of the usual water paint, certain ingredients which combine therewith to impart thereto the characteristic qualities of the expensive oil paint vehicle. We thus obtain a paint which combines the advantages of the usual water paint as regards cost with those of the usual oil paint as regards opacity and covering powers, and which, moreover, can be applied effectively in a single coat, whereas the usual water and oil paints both require two applications. In our paint, the pigments are distributed uniformly throughout the mass so that their true tones are brought out when applied, instead of being covered by an overlying film of oil, as with the usual oil paint.

Our paint is characterized by a lesser amount of pigment per gallon than is required in other paints, while being, however, extremely brilliant in pigmentation, and by a spreading and clinging capacity which causes the paint film to sink into the texture of the surface to be covered, rather than remain on the exterior as an inert film body. With our paint, the film formation is markedly uniform, and the film has no tendency to snap open into small pit holes, or globules, which leave bare pits, or circles, and which will not fill up unless the painter goes over the surface a second time, with resultant waste of labor and material. Our paint enables us to re-coat a surface without washing off the original coating, and without the necessity of re-priming the surface, as is necessary with the usual water paint. While particularly intended for use as an interior finish, it may be used for outside surfaces, and may be brushed or sprayed with equal facility.

According to our invention, we mix with the adhesive vehicle containing the pigments an agent having the dual properties of plasticizing the mass and suspending the pigments therein, and an agent having the dual properties of lubricating the mixture, thus improving its spreading power, and of flexibilizing the paint film in the drying stage thereof by equalizing the strains, thus preventing cracking and checking.

The adhesive vehicle may be any animal proteid, as casein, glue, or albumen, or may be sodium silicate. Where casein is used, it may be the commercially prepared product now on the market.

The pigments used are characteristically the brilliant, high grade pigments usually found in oil paints, as lithopone and zinc oxide. Variations may be had by using carbonate of lead, sublimed lead, blue lead, titanium oxides, iron oxides, manganese oxides, carbon black, lamp black, umbers, ochres or siennas.

The suspension agent may be clay, asbestine, silica or other inert matter. Clay is the preferred material, but where easier spread and slide are desired, we may replace a portion of the clay, or other agent used, with talc or material having the properties of talc.

The lubricant may be any emulsified wax or non-drying oil, as paper-makers' wax, which is a well known preparation in the paper-making trade, and consists in part of stearine and paraffine, or japan wax may be used.

The wax blends with the casein, or other adhesive binder, retarding the hardening action thereof, and lubricating the pigment mass, allowing the strains in the paint film to equalize themselves in the drying stage, and giving a smooth, slick spread as the paint is applied. It also assists to anchor the fluid body of the paint to the spot where it is applied, thus preventing running and spattering while the paint is being applied, and to some extent, acts as a whitener or bleacher for the casein.

Although the proportions may be varied as occasion requires, we have found that excellent results are obtained with approximately the following mixture:

| | |
|---|---|
| Binder | 1 lb. |
| Pigment | 3 lbs. |
| Suspension agent | 1 lb. |
| Lubricant | 3 ounces |

In mixing our paint composition, the casein is first put in solution by means of any usual solvent, as water and ammonia, by which the casein is dissolved in the presence of heat, after which the other ingredients are mixed therewith. The preparation is now ready to be mixed with water, preferably hot water, at a temperature of about 150° F., although good results may be obtained where cold water is used. Ordinarily, we use a one to one ratio, that is to say, a pint of water for every pound of material. The material is gradually added to the water while being thoroughly stirred until reduced to oil paint consistency, and is then allowed to stand for a sufficient length of time, usually twelve hours, so as to insure thorough dissolution of the adhesive. At this point, if desired, suitable tints may be added. As will be obvious, however, we may vary the method of combining the ingredients according to the ultimate character of the products desired. For example, if a paint in paste form is wanted, we may dilute the mix with sufficient water to form a paste before the mix is packaged, and may add the necessary additional water to reduce the paste to brushing consistency just before the paint is applied.

Various modifications in ingredients and proportions may obviously be resorted to within the spirit of our invention, as defined by the appended claims.

What we therefore claim and desire to secure by Letters Patent is:

1. As a new composition of matter for use as a single coat paint, a mixture which when diluted with water forms a spreadable coating which may be applied to a surface to form a quick drying permanently white light reflective film of great covering and hiding power, said mixture including a casein solution, a permanently white finely divided pigment, clay, and a wax emulsion acting to retard the hardening action of the casein, lubricating the pigment mass, and flexibilizing the paint film to prevent cracking and checking thereof in the drying stage, the proportions of said mixture by weight being approximately as follows: casein, 1 lb.; pigment, 3 lbs.; clay, 1 lb.; wax emulsion, 3 oz.

2. As a new composition of matter for use as a single coat paint, a mixture including a casein solution, a permanently white finely divided pigment, clay, and a wax emulsion acting to retard the hardening action of the casein to lubricate the pigment mass and to flexibilize the paint film so as to prevent cracking and checking thereof in the drying stage, the proportions of said mixture being such as to produce when diluted with water a spreadable coating which may be applied to a surface to form a quick drying permanently white light reflective film of great covering and hiding power.

3. As a new composition of matter for use as a single coat paint, a mixture including a casein solution, lithopone, clay, and paper-makers' wax in such proportions as to produce when diluted with water a spreadable coating which may be applied to a surface to form a quick drying permanently white light reflective film of great covering and hiding power.

In testimony whereof we affix our signatures.

ALFRED P. GOODELL.
GARDNER W. TARR.